United States Patent [19]

Watari

[11] Patent Number: 4,794,645

[45] Date of Patent: Dec. 27, 1988

[54] CONTINUOUS SPEECH RECOGNITION APPARATUS

[75] Inventor: Masao Watari, Tokyo, Japan

[73] Assignee: NEC Corporation, Tokyo, Japan

[21] Appl. No.: 15,458

[22] Filed: Feb. 17, 1987

[30] Foreign Application Priority Data

Feb. 14, 1986 [JP] Japan .................................. 61-31179

[51] Int. Cl.$^4$ ................................................. G10L 5/00
[52] U.S. Cl. ..................................... 381/43; 364/513.5
[58] Field of Search ...................................... 381/41–43; 364/513.5

[56] References Cited

U.S. PATENT DOCUMENTS

| | | | |
|---|---|---|---|
| 4,581,755 | 4/1986 | Sakoe | 381/42 |
| 4,667,341 | 5/1987 | Watari | 381/43 |
| 4,677,678 | 6/1987 | Ukita et al. | 381/43 |

OTHER PUBLICATIONS

Transactions of the IELE of Japan, vol. E65, No. 11, 11/82, Sakoe pp. 649–656.

Primary Examiner—Vit W. Miska
Attorney, Agent, or Firm—Sughrue, Mion, Zinn, Macpeak & Seas

[57] ABSTRACT

A start point vicinity of an uttered input speech pattern is set. DP-matching is performed between the input speech pattern and a plurality of reference patterns obtained by connecting previously prepared reference patterns in the start point vicinity of a portion for the head word of the input speech pattern. A point within the start point vicinity is determined as a temporary start point. The dissimilarity proportional to the time length of the reference pattern is calculated and then converted into a value proportional to the time length of the input pattern from the temporary start point. The dissimilarity measure between the input speech pattern and the reference pattern on the second and the following digits are determined as a value proportional to the time length of the input speech pattern. The end time point of the input speech pattern is determined on the basis of the minimum value of a normalized dissimilarity measure and by the time length of the input speech pattern.

11 Claims, 11 Drawing Sheets

CONTINUOUS SPEECH RECOGNITION APPARATUS

BACKGROUND OF THE INVENTION

The present invention relates to a continuous speech recognition apparatus, and particularly to an improvement in speech recognition accuracy affected by the detection of the starting and ending time points of continuously uttered speech.

In order to recognize continuously uttered speech a method has been used conventionally in which a connected reference pattern obtained by connecting a plurality of word reference patterns is matched with an input pattern (continuous speech) by use of dynamic programming. An order number of the sequentially connected reference pattern is expressed as a "digit" hereinafter. Words, syllables, semiwords, or clauses may be used as the reference patterns.

This method is based upon an assumption that the start and end points of the input pattern are previously determined by utilizing the power or spectrum of the input speech, but these are mistakenly detected in many cases due to a change in SN or a noise effect. When detection occurs erroneously, a silent portion may be added to the start or end portion of a word pattern in the input pattern, or the start or end portion of a word pattern in the input pattern may be cut, resulting in the likelihood of mistaken recognition.

In order to reduce the effect of this kind of speech detection error, a method is described in pages 1318 to 1325 of "Connected Spoken Digit Recognition by O(n)DP Matching" in The Transactions of The Institute of Electronics and Communication Engineers of Japan Vol. J66-D, No. 11 (1983), in which the start and end points of the input speech are not predetermined, input patterns and reference patterns being matched from the vicinity of the start point ($i_{s1}$ to $i_{s2}$) to the vicinity of the end point ($i_{e1}$ to $i_{e2}$).

A conventional method will first be discussed before this method is explained.

A speech pattern A produced by continuous utterance is expressed as $$A = \vec{a}_1, \vec{a}_2, \ldots \vec{a}_i, \ldots \vec{a}_I \quad (1)$$

which is called an input pattern. On the other hand, a reference pattern $$B^n = \vec{b}_1{}^n, \vec{b}_2{}^n, \ldots \vec{b}_j{}^n, \ldots \vec{b}_J{}^n \quad (2)$$

is prepared for each word n, which is called a word reference pattern. DP-matching is performed between a connected speech reference pattern $C = B^{n1}, B^{n2}, \ldots, B^{nx}$ obtained by connecting X word reference patterns and the input pattern A to calculate a measure of difference (distance) between the two patterns. This difference is called the "dissimilarity measure". A word sequence giving a minimum dissimilarity measure D(A, C) shown by the following equation is considered as a recognition result.

$$D(A, C) = \min \left[ \sum_{i=1}^{I} d(i, j) \right] \quad (3)$$

$$j = j(i).$$

wherein the minimum dissimilarity measure is determined by a dynamic programming algorithm described below. This algorithm is the so-called VLB (Clockwise DP) algorithm.

The initial condition is:

$$\left.\begin{array}{l} T(0,0) = 0 \\ T(i,p) = \infty, i \neq 0, p \neq 0 \\ G(p,n,j) = \infty \end{array}\right\} \quad (4)$$

A recurrence formula (6) is successively calculated for each digit from i=1 to I based on the boundary conditions shown by equation (5), wherein T(i,p) denotes the cumulative dissimilarity to the p-th digit when calculated to the i-th frame of the input pattern. This is called a digit dissimilarity measure. G(p,n,j) denotes a cumulative dissimilarity measure to the j-th frame of word n on the (p+1)th digit, which is called the temporary dissimilarity measure. For the n-th word of the reference pattern on the (p+1)th digit, under the boundary conditions:

$$\left.\begin{array}{l} G(p,n,0) = T(i-1,p) \\ H(p,n,0) = i = 1 \end{array}\right\} \quad (5)$$

the following recurrence equations are calculated from j=1 to $J^n$ (from the start point to the end point of the n-th reference pattern), $$g(j) = d(j) + \min \begin{cases} G(p,n,j) \\ G(p,n,j-1) \\ G(p,n,j-2) \end{cases} \quad (6)$$

$$H(p,n,j) = H'(p,n,\hat{j}) \quad (7)$$

where $\hat{j}$ is j', giving a minimum G(p,n,j') on the right side of the equation (6), H(p,n,j) indicates the start point of word n on the (p+1)th digit and is called the temporary start point indicator, and H'(p,n,j) is H(p,n,j) at the frame prior to one frame of the input pattern. Having been obtained in this names, g(j) and H(p,n,j) are stored as G(p,n,j) and H(p,n,j) respectively; wherein d(j) is the distance between feature vector $\vec{a}_i$ at input pattern time (frame) i and feature vector $\vec{b}_j{}^n$ at the n-th reference pattern time (frame) j this can be determined, for example, as Chebyshev distance:

$$d(j) = Dis(\vec{a}_m, \vec{b}_j{}^n) = \sum_{k=1}^{K} |a_m{}^k - b_j{}^n{}^k| \quad (8)$$

For the sake of minimization at the boundary of words, equation (9) is calculated:

$$\left.\begin{array}{ll} \text{if} & T(i,p+1) \quad G(p,n,J^m) \\ \text{then} & T(i,p+1) = G(p,n,J^m) \\ & N(i,p+1) = n \\ & L(i,p+1) = H(p,n,J^m) \end{array}\right\} \quad (9)$$

wherein L(i,p+1) is the p-th digit start point when calculated to the i-th frame of the input pattern.

That is to say, the recurrence equation (6) is calculated for each pair (p,n) on one digit along the reference pattern time axis. This calculation is performed to the end point i=I along the input pattern time axis.

Recognition results of the input pattern are obtained according to the following procedure:

Initial condition: $\quad p = X, i = I \quad$ (10)

Recognition word: $\quad n = \hat{N}(i,p)$
Word start point $\quad l = \hat{L}(i,p).\quad$ (11)

If p≠0, the processing of equation (11) is repeated under the conditions p=p-1 and i=l̂. If p=0, the processing is completed.

As shown in the equation (3), the dissimilarity measure between the input pattern A and the reference pattern C is increased by distance d(i,j) therebetween for one frame calculation movement along the input pattern axis. This calculation of the dissimilarity measure is started, as shown in the equation (4), by adding the dissimilarity measure obtained at the first frame of the input pattern when the digit dissimilarity measure at the 0-th frame T(0,0) is zero. Thus the cumulation to the I-th frame at the end of the input pattern is performed. In this case, as shown in FIG. 1, the calculation of DP-matching is started after the start (i=1) and end (i=I) points have been previously set.

On the other hand, in the method described in the reference it is assumed that an initial value of the digit dissimilarity measure at the temporary starting point i=1 is T(0,0) and, if the start point i≠1, the initial value is T(i,0)=dδx i in the vicinity of the temporary starting point $i_{S1} \leq i \leq i_{S2}$ as a penalty due to deviation from the start point i=1. This makes it possible to allow an unfixed start point in the matching, so that the start point may be in the range of $i_{S1} \leq i \leq i_{S2}$.

However, if dδ=0, the initial value becomes zero in the vicinity of the temporary starting point $i_{S1} \leq i \leq i_{S2}$. The number of times d(i,j) is added is reduced when the start point is nearer $i_{S2}$. Conversely, if dδ=∞, the starting point is allowed to be just i=1 and does not become a free starting point. Thus, it is necessary to set the value of dδ close to the average value of d(i,j), but the average value of d(i,j) depends upon the speaker and the words used, which causes a problem with determining dδ appropriately.

SUMMARY OF THE INVENTION

It is therefore an object of the present invention to provide a continuous speech recognition apparatus which enables highly precise DP-matching with an unfixed starting point.

It is another object of the present invention to provide a continuous speech recognition apparatus which exhibits an extremely reduced rate of recognition error resulting from speech detection error.

It is a further object of the present invention to provide a continuous speech recognition apparatus which enables DP-matching with a free end.

According to the present invention there is provided a continuous speech recognition apparatus in which the start point vicinity of an uttered input speech pattern is set, then DP-matching is performed between the input speech pattern and a plurality of reference patterns obtained by connecting previously prepared reference patterns in a portion for the head word of said input speech pattern. A dissimilarity measure proportional to the time length of the reference pattern is calculated, and then converted into a value proportional to the time length of the input pattern from a temporary start point. A point within the start position vicinity is determined as the temporary start point. The dissimilarity measure between the input speech pattern and the reference pattern on the second and the following digits are determined as a value proportional to the time length of the input speech pattern. The end point of the input speech pattern is decided on the basis of the minimum value of a normalized dissimilarity measure and by the time length of the input speech pattern.

Other objects and features of the present invention will become clear from the following description with reference to the drawings.

PREFERRED EMBODIMENTS OF THE INVENTION

The basic principle of the present invention will first be described.

Figure 2:
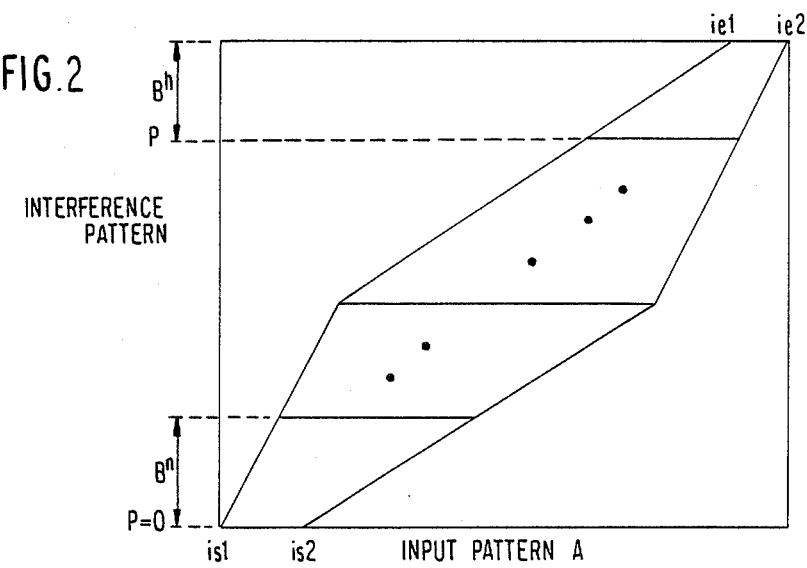
FIG. 2 is a drawing for explaining a continuous speech recognition method according to the present invention.

As shown in FIG. 2, DP-matching is performed in the start vicinity, $i=i_{S1}, \ldots, i_{S2}$ of an input pattern by using recurrence equations. These equations develop a dissimilarity measure proportional to the time length of the reference pattern. The start vicinity is determined on the basis of a time point when the input speech signal level exceeds a certain threshold. A temporary start point ranges within the start vicinity. More specifically, under the initial condition:

$T(i,p) = \infty$ if $p = 0$ and $i_{S1} \leq i \leq i_{S2}$ \quad (12)

$T(i,p) = 0$

DP-matching is performed for the first (head) word of the sentence in the following manner:

Initial condition:

$g(i - 1,0) = T(i - 1,0)$
$h(i - 1,0) = i - 1$ \quad (13)

Recurrence equation:

-continued $$g(i,j) = d(i,j) + \min \begin{cases} g(i,j-1) \\ g(i-1,j-1) \\ g(i-2,j-1) \end{cases} \quad (14)$$

$$h(i,j) = h(\hat{i}, j-1) \quad (15)$$

wherein $\hat{i}$ is $i'$ giving the minimum $g(i', j-1)$ on the right side of the equation (15). The recurrence equation is calculated from $i=1$ to I and from $j=1$ to $J^n$.

The resulting $g(i, J^n)$ of DP-matching which has been calculated for the first word is a value proportional to the time length of the reference pattern. This $g(i, J^n)$ is converted into a value $G(i)$ proportional to the time length of the input pattern from the temporary start point. Namely, assuming that the temporary start point of the input pattern is $i=1$ even if the true starting point is not $i=1$, this value $G(i)$ is obtained by an equation (16).

$$G(i) = \frac{i}{J^n} \cdot g(i, J^n) \quad (16)$$

Then, as regards minimization of the word boundary, $$\begin{aligned} \text{if} \quad & T(i,1) > G(i) \\ \text{then} \quad & T(i,1) = G(i) \\ & N(i,1) = n \\ & L(i,1) = h(h,J^n) \end{aligned} \quad (17)$$

is calculated from $i=1$ to I.

Here, $g(i,J^n)$ is obtaieed by adding $d(i,j)$, $J^n$ times. The equation (17) represents conversion into a value obtained by equivalently adding $d(i,j)$ i times. $G(i)$ is a value obtained under the case that the start point is $i=1$. Therefore, it becomes possible to connect the algorithm of the present invention to a conventional start point-fixed algorithm. In other words, DP-matching after the second digit is performed in the same way as in the conventional method.

Then, DP-matching with the reference pattern with respect to words after the second one is performed in the same way as conventional matching. Namely, as matching of the $(p+1)$th word, Initial condition:

$$\begin{aligned} g(i-1,0) &= T(i-1,p) \\ h(i-1,0) &= i-1 \end{aligned} \quad (18)$$

Recurrence equation:

$$g(i,j) = d(i,j) + \min \begin{cases} g(i-1,j) \\ g(i-1,j-1) \\ g(i-1,j-2) \end{cases} \quad (19)$$

$$h(i,j) = h(i-1,\hat{j}) \quad (20)$$

wherein $\hat{j}$ is $j'$ giving the minimum $g(i-1,j')$ on the right side of the equation (19), is calculated from $i=1$ to I and $j=1$ to $J^n$. Then, as regards the minimization of the word boundary, for each word n, $$\begin{aligned} \text{if} \quad & T(i,p+1) > g(i,J^n) \\ \text{then} \quad & T(i,p+1) = g(i,J^n) \\ & N(i,p+1) = n \\ & L(i,p+1) = h(i,J^n) \end{aligned} \quad (21)$$

is calculated from $i=1$ to I.

For determining the end point, as shown in FIG. 2, the minimum normalized dissimilarity measure in the vicinity of the end point $i=i_{e1}$ to $i_{e2}$ on the final digit X is determined.

$$\begin{aligned} \text{if} \quad & V > 1/i \cdot T(i,X) \\ \text{then} \quad & V = 1/i \cdot T(i,X) \\ & I_e = i \end{aligned} \quad (22)$$

is calculated for the vicinity of the end point $i=i_{e1}$ to $i_{e2}$. The vicinity of the end point is set in a similar manner to the setting of the vicinity of the start point. The resulting $I_e$ is the end (terminating) time and V is the minimum normalized dissimilarity measure. Therefore, the end point may be in the range of $i_{e1} \leq i \leq i_{e2}$ and becomes an unfixed end point.

Finally, the sequence of the reference pattern is determined along the DP-matching path through which the minimum normalized dissimilarity measure is obtained, thereby obtaining the recognition result. This processing is performed by the following procedures:

$$\begin{aligned} \text{Initial condition:} \quad & p = x, i = I_e \\ \text{Recognition word:} \quad & \hat{n} = N(i,p) \\ \text{Word starting point:} \quad & \hat{i} = L(i,p) \end{aligned} \quad (23)$$

If $p \neq 0$, assuming that $p = p-1$ and $i = \hat{i}$, the equation (23) is repeated. If $p = 0$, the processing is completed.

Figure 4:
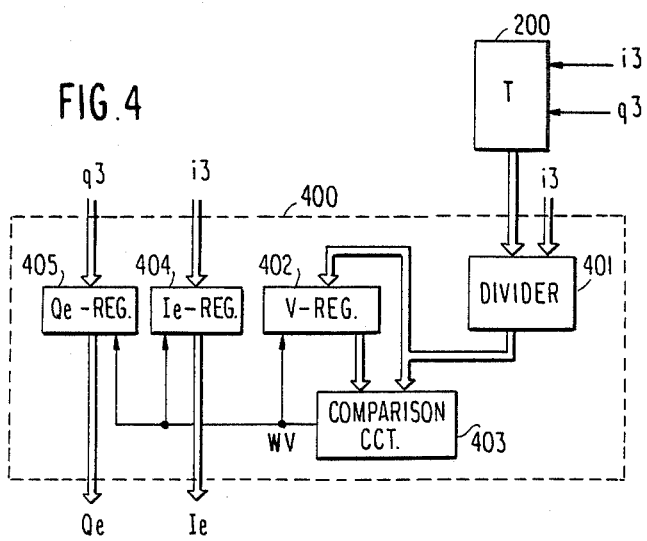
FIGS. 4 and 5 are partially detailed block diagrams of the block diagram shown in FIG. 3.
Figure 3:
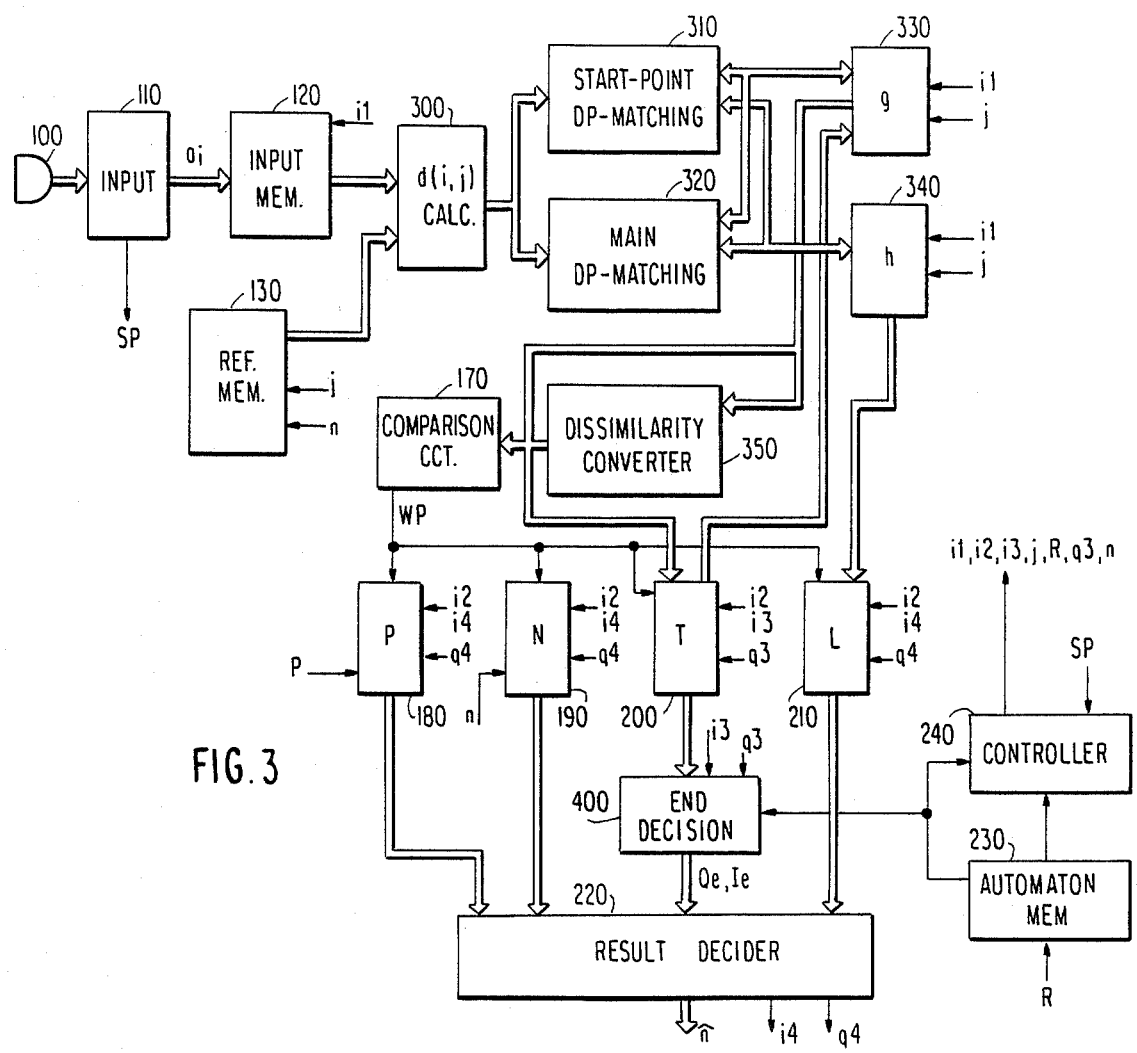
FIG. 3 is a block diagram which shows an embodiment of the present invention.
Figure 5:
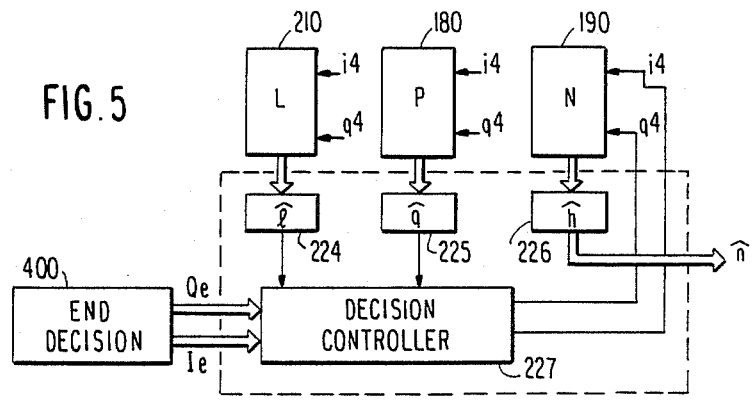
Figure 6:
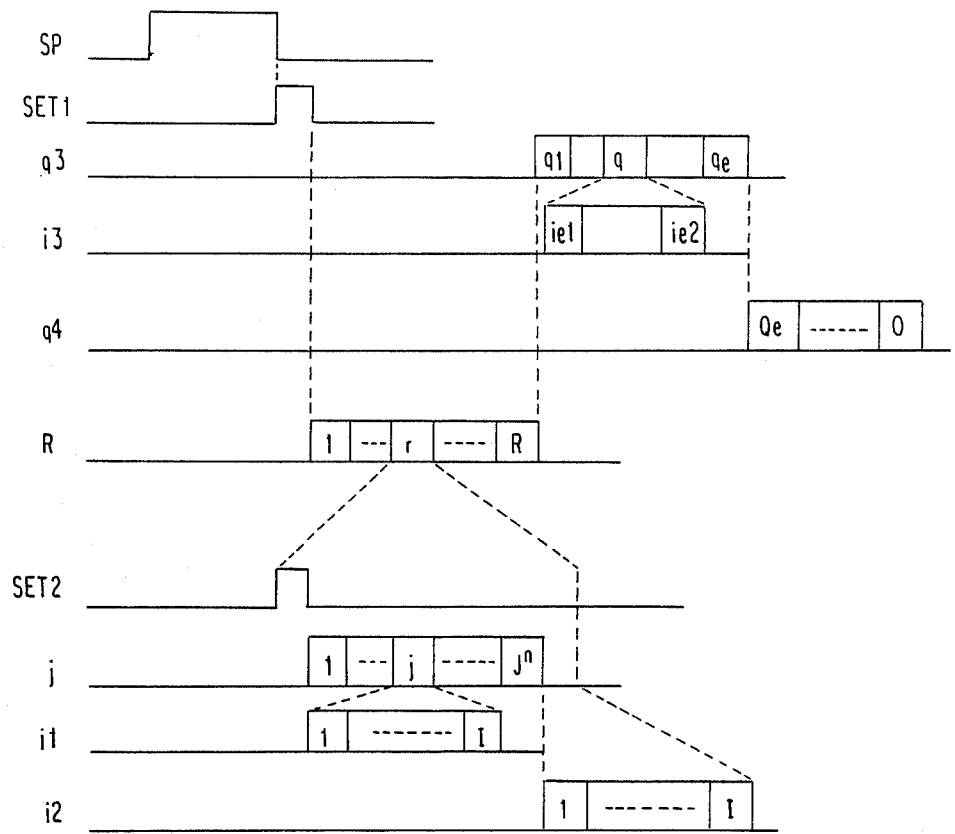
FIG. 6 is an operating time chart of the embodiment shown in FIG. 3.

An embodiment of the present invention will now be described with reference to the drawings. FIG. 3 is a block diagram showing an embodiment of the present invention; FIGS. 4 and 5, block diagrams showing the partially detailed arrangement of the embodiment shown in FIG. 3; FIG. 6, a time chart showing the time relationship of the operations in FIG. 3; and FIGS. 7A to 7H, flow charts showing the flow of the operations in FIG. 3.

There has been proposed a method known as the Level Building Methdd for calculating DP-matching between input pattern and connected patterns of reference patterns. This method is described on pages 284 to 297 in IEEE TRANSACTIONS ON ACOUSTICS, SPEECH AND SIGNAL PROCESSING, VOL ASSP-29, No. 2, APRIL, 1981.

The present invention may be applied to this method (Level Building Method) and realizes DP-matching with unfixed start and end points, that is, the start and end points are free in the DP-matching. An automaton control can be used for connecting the reference patterns and any word connections can be expressed by suitably setting state transition rules described by automatons. In the embodiment, an automaton is difined as Automaton $\alpha = (K, \Sigma, \Delta, P_0, F)$
where K: A set of states $\{p \mid p=1,2,\ldots,\pi\}$ $\Sigma$: A set of input words $n\{n \mid n=1,2,\ldots,N\}$ $\Delta$: A state of transition rules $\{\gamma(p,q,n)\}$ where $\gamma(p,q,n)$ means a transition $p^n \rightarrow q$ $P_0$: An initial state, expressed as $p=0$ hereinafter F: A set of final states $F \subset K$.

The reference pattern $B^n$ of a word n contained in the set of words $\Sigma$, is stored in a reference pattern memory 130. Designation information of the state transition rules $\gamma(p,q,n)$ and the final states F are stored in an automaton memory 230.

Figure 7A:
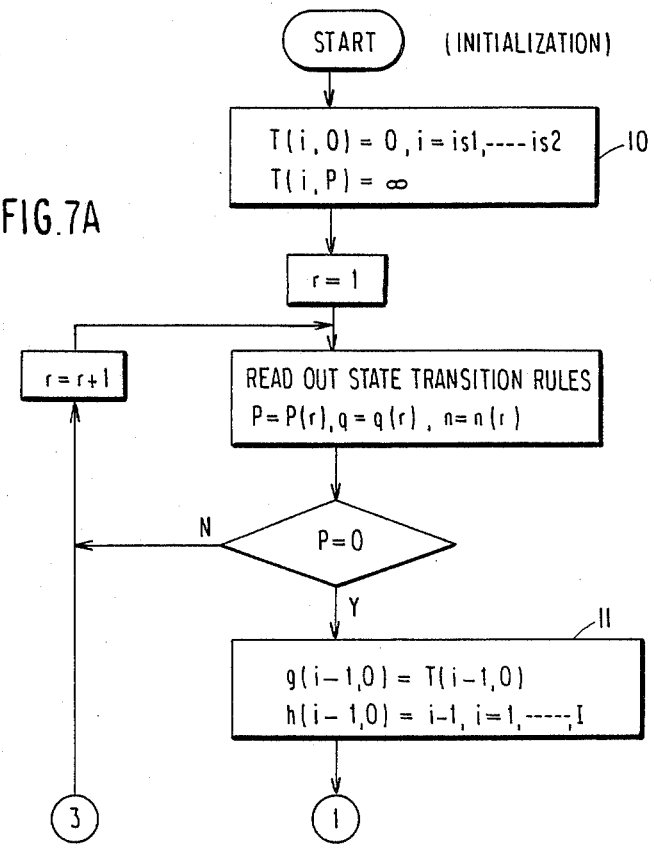
FIGS. 7A to 7H are flow charts which show the operation flow of the embodiment shown in FIG. 3.

When an unknown input speech is input from a microphone 100, the input speech is subjected to frequency analysis by an input portion 110 to develop feature vectors $a_i$. Feature vectors $a_i$ thus developed are successively sent into an input pattern memory 120. The input portion 110 determines a speech section by detecting a speech level, a speech section signal SP which is "1" in the speech section and "0" in other sections being generated. A control portion 240 generates an initialization pulse SET1 at a time (a temporary start point) at which this speech section signal SP falls (FIG. 6). Therefore, the initialization corresponding to the equation (12) and block 10 in FIG. 7A is performed for a T-memory 200.

Figure 7B:
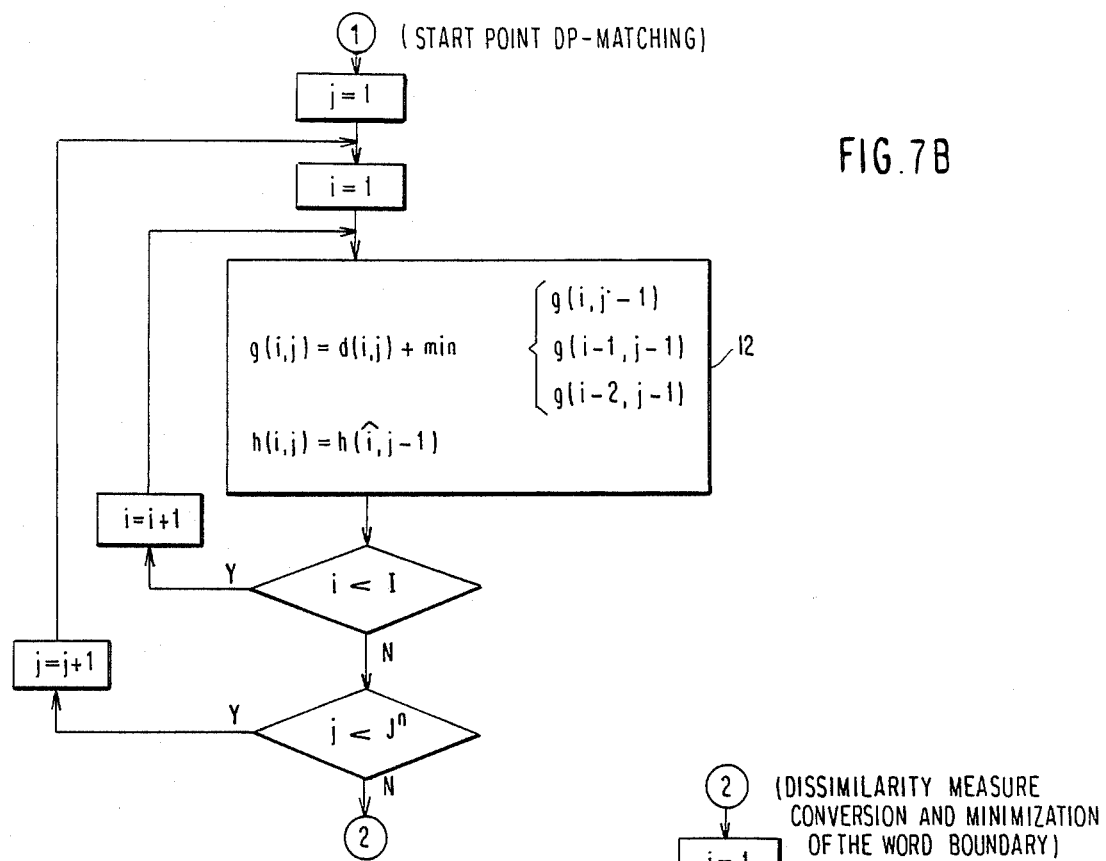

After the above-described initialization has been completed, the dissimilarity measure calculation is started for $\gamma(p,n,q)$ at $p=0$ (initial state) among the state transition rules $\gamma(p,q,n)$ in DP-matching portion 310. First, the boundary conditions corresponding to the equation (13) and block 11 in FIG. 7 are set for a g-memory 330 and an h-memory 340, which are work memories for DP-matching, by a signal SET2 from the control portion 240. Then, a reference pattern time signal j and an input pattern time signal $i_1$ output from the control portion 240 change from 1 to $J^n$ and 1 to I, respectively. In each (i,j), the calculation of a recurrence equation corresponding to block 12 in FIG. 7B is conducted in the start point DP-matching portion 310. That is to say, the input pattern at a frame i and the n-th reference pattern at a frame j are read out from the input memory 120 and a reference memory 130 respectively, and the distance d(i,j) between the feature vectors shown in the equation (8) is determined in a distance calculation portion 300. Then, the recurrence equations shown by the equations (14) and (15) are calculated in the start point DP-matching portion 310.

When the above-described calculations are completed, a dissimilarity measure $g(j,N^n)$ at an end time point $J^n$ of the reference pattern is obtained. Then, according to a process corresponding to block 13 in FIG. 7C, the dissimilarity measure $g(i,J^n)$ is converted into a value proportional to an input pattern time length in a dissimilarity measure converting portion 350. In other words, the division shown in the equation (16) is performed to obtain G(i).

Figure 7C:
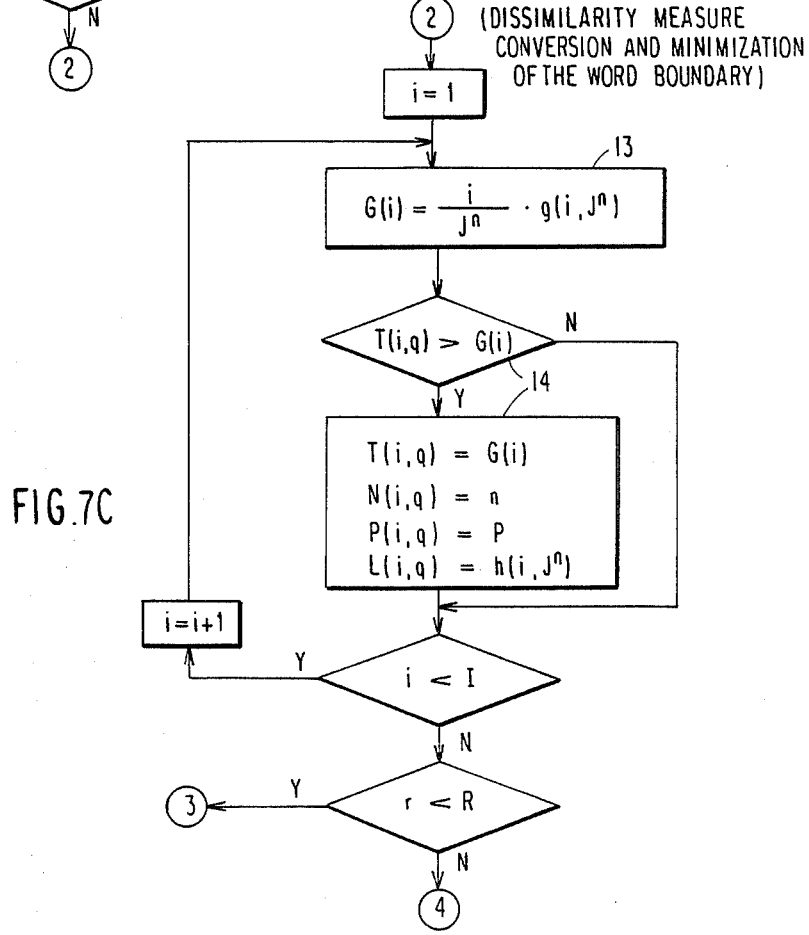

Then, the comparison shown in block 14 in FIG. 7C is performed in accordance with the signal $i_2$ generated from the control portion 240. Namely, the minimization of the word boundary shown in the equation (17) is conducted. T(i,q) is read out from a table memory 200 in accordance with the signals $i_2$ and $q_3$ and compared with G(i), which is outputted from the dissimilarity measure converting portion 350, in a comparison circuit 170. If T(i,q)>G(i), a signal $W_p$ is generated and p, n, G(i) and $h(i,J^n)$ are written into table memories 180, 190, 200 and 210 as P(i,q), N(i,q), T(i,q) and L(i,q), respectively.

Figure 7D:
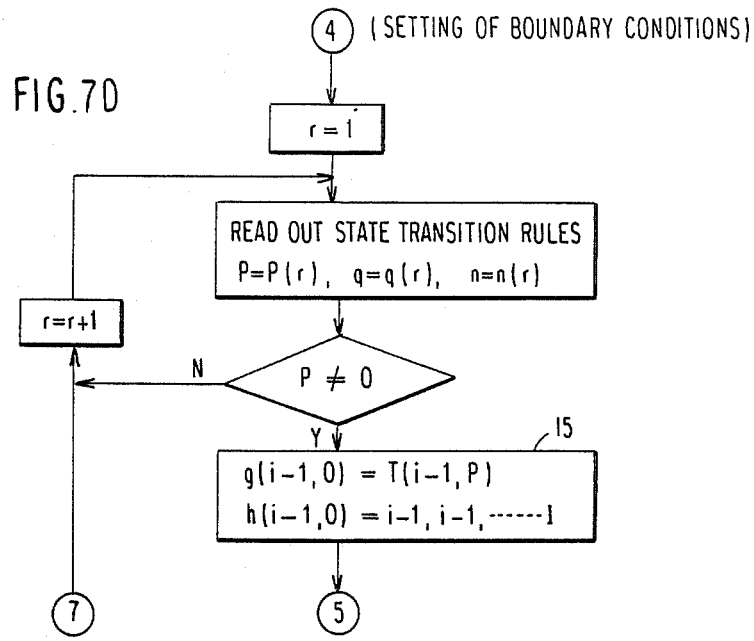

After the above-described calculations are completed for $\gamma(p,q,n)$ at $p=0$ (initial state) among the state transition rules $\gamma(p,q,n)$, the dissimilarity measure for $\gamma(p,q,n)$ at $p\neq 0$ are calculated in a main DP-matching portion 320. The setting of boundary conditions corresponding to block 15 in FIG. 7D is performed for the g-memory 330 and h-memory 340, which are the DP-matching work memories, by the signal SET2 from the control portion 240.

Figure 7E:
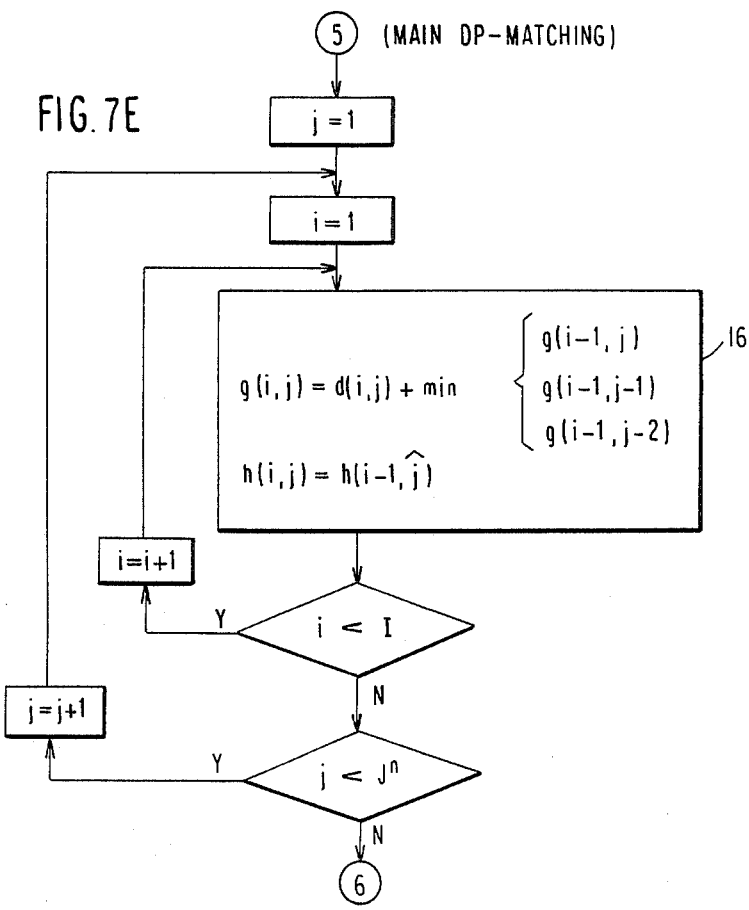

In succession, a reference pattern time signal j and an input pattern time signal $i_1$ outputted from the control portion 240 change from 1 to $J^n$ and 1 to I, respectively. At each (i,j), the calculation of a recurrence equation corresponding to block 16 in FIG. 7E is conducted in the main DP-matching portion 320. That is to say, the frame i of the input pattern and the frame j of the n-th reference pattern are read out and the distance d(i,j) between the feature vectors shown in the equation (8) is determined in a distance calculation portion 300. Then, the recurrence equations shown by the equations (19) and (20) are calculated in the main DP-matching portion 320.

When the above-described calculations are completed, a dissimilarity measure $g(j,J^n)$ at an end time point $J^n$ of the reference pattern is obtained.

Figure 7F:
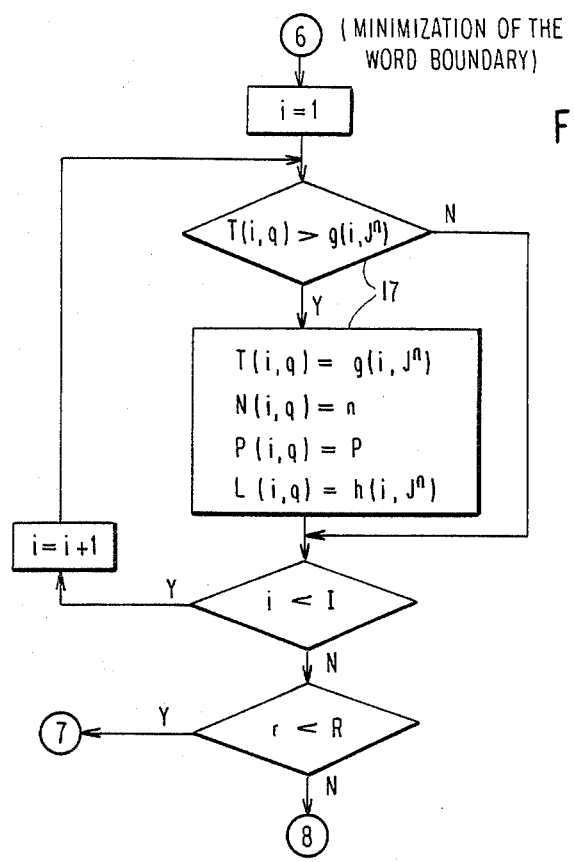
Figure 7G:
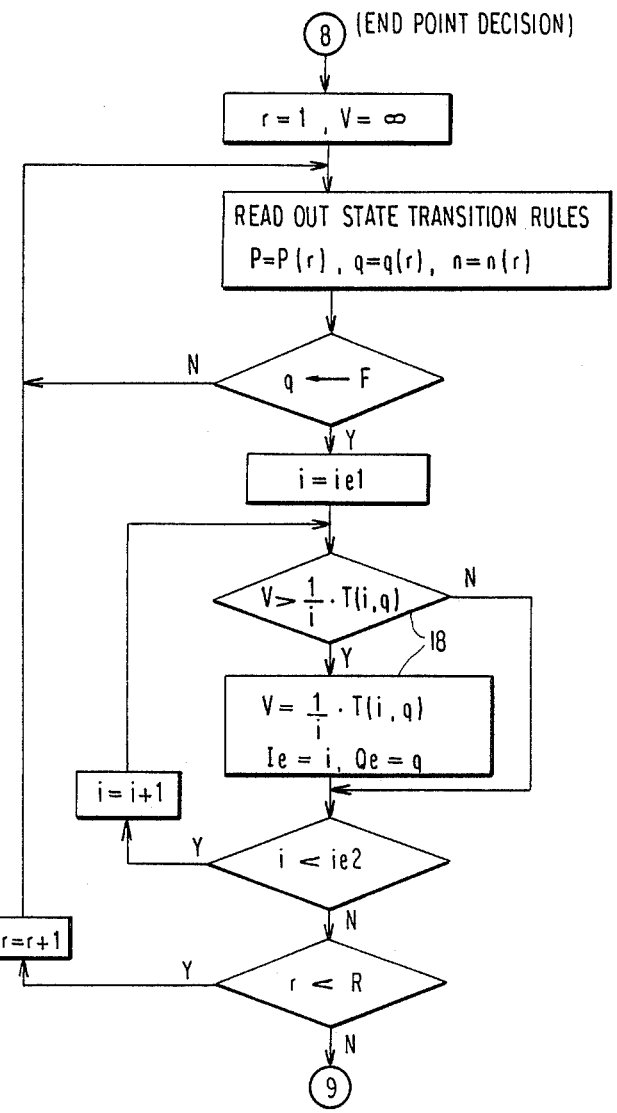
Figure 7H:
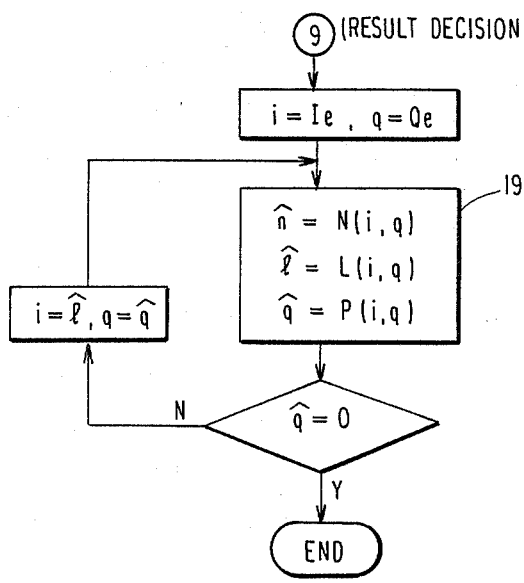

Then, the comparison shown in block 17 in FIG. 7F is performed in accordance with the signal $i_2$ generated from the control portion 240. Namely, the minimization of the word boundary shown in the equation (21) is conducted. T(i,q) is read out from the table memory 200 in accordance with the signals $i_2$ and p and compared with G(i) outputted from the difference converting portion 350 by a comparison circuit 170. If T(i,q)>G(i), a signal $W_p$ is generated and G(i), n, p, and $h(i,J^n)$ are written in the table memories 180, 190, 200 and 210 as P(i,q), N(i,q), T(i,q) and L(i,q), respectively.

By the above-described processing, the calculations are completed for $\gamma(p,q,n)$ at $p\neq 0$ (initial state) among the state transition rules $\gamma(p,q,n)$ in response to a signal R from the controller 240.

After the calculation of the dissimilarity measures have been completed for all the state transition rules $\gamma(p,q,n)$, an end time point is determined by an end decision portion 400. The end decision portion 400 is constructed as shown in FIG. 4 and performs the calculation corresponding to the equation (22) and block 18 in FIG. 7G. T(i,q) is read out from the T-table memory 200 by a signal $q_3$ indicating a final state and a signal $i_3$ indicating the time in the vicinity of the end point, which are obtained from the control portion 240. The normalized dissimilarity measure $1/i \cdot T(i,q)$ is determined in a divider 401. The normalized dissimilarity measure $1/i \cdot T(i,q)$ is compared with the minimum normalized dissimilarity measure V, which has been previously determined, by a comparison circuit 403. If $V > 1/i \cdot T(i,q)$, a signal WV is generated and $1/i \cdot T(I,q)$, i, and q are written in a V-register 402, a $I_e$-register 404, and a $Q_e$-register 405, respectively. The processing of all of q in the condition qeF is performed in the vicinity of the end point from $i=i_{e1}$ to $i=i_{e2}$ to obtain an end point $I_e$ and a final state $Q_e$ in which the minimum normalized dissimilarity measure is obtained.

Finally, the recognition results are obtained on the basis of the DP-matching path through which the minimum normalized dissimilarity measure is developed in a result decision portion 220. The result decision portion 220 is constructed as shown in FIG. 5 and conducts the calculation corresponding to the equation (23) and block 19 in FIG. 7H. In the initial condition in which a state is $Q_e$ and an end time point is $I_e$, a decision control portion 227 generates address signals $i_4$ and $q_4$ to table memories 190, 210, and 180, assuming that $i=I_e$ and $q=Q_e$, and reads out N(i,q), L(i,q), and P(i,q) therefrom. This N(I,q) is output as a recognition result and L(i,q) and P(i,q) move to the next i, q. This processing is repeated until the q becomes zero so that recognition results are successively obtained.

Figure 8:
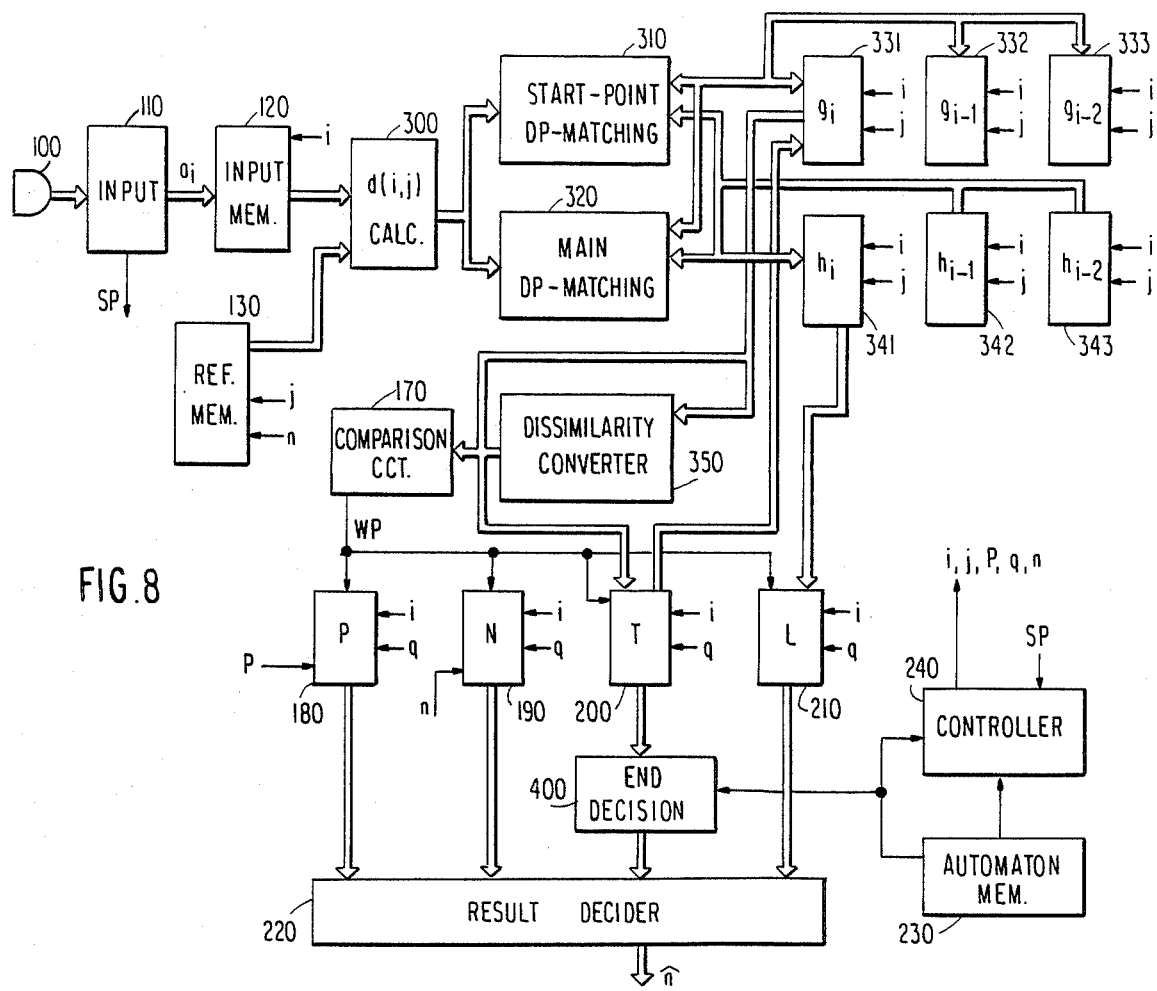
FIG. 8 is a block diagram which shows another embodiment of the present invention.
Figure 9:
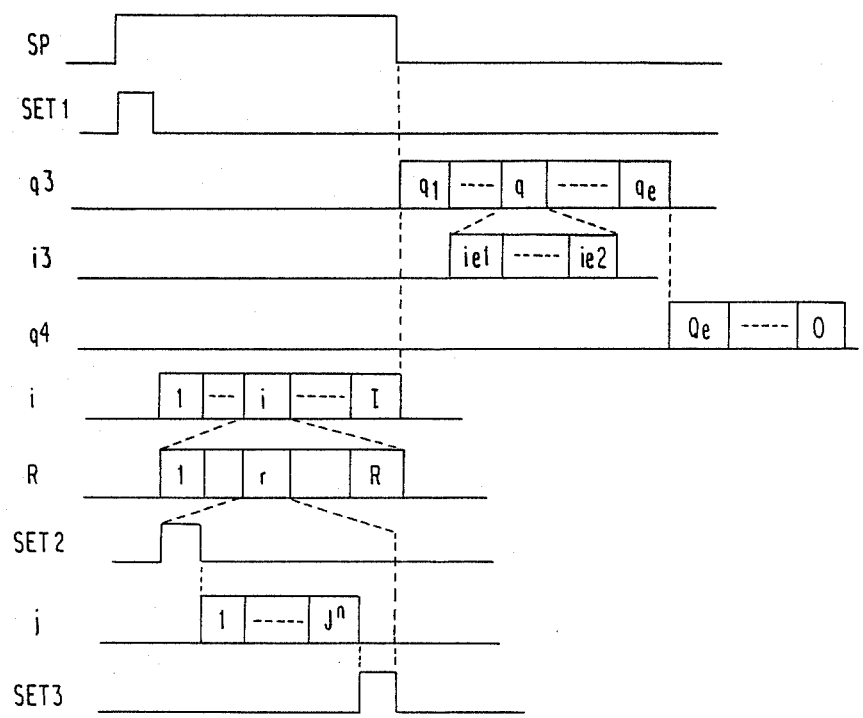
FIG. 9 is an operating time chart of the embodiment shown in FIG. 8.

FIG. 8 is a block diagram showing another embodiment of the present invention, FIG. 9 is a time chart showing the relationship between the time and the operation in FIG. 8, and FIGS. 10A to 10F are flow charts showing the flow of operations in FIG. 8.

This embodiment utilizes so-called a CWDP (Clockwise DP) method described in U.S. Pat. No. 4,555,796.

Figure 1:
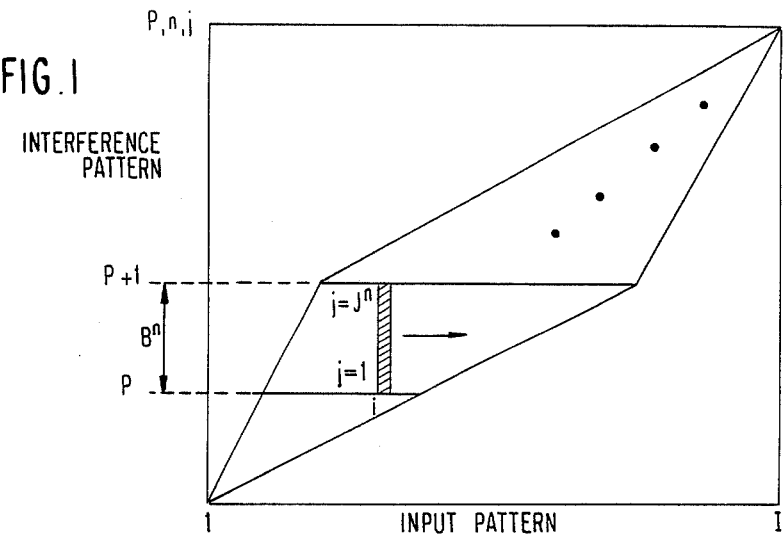
FIG. 1 is a drawing for explaining the conventional method of the speech recognition.
Figure 10A:
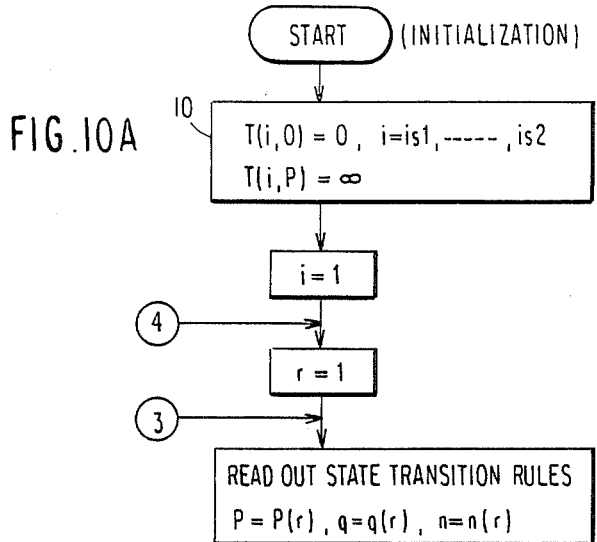
FIGS. 10A to 10F are flow charts which show the operation of the embodiment shown in FIG. 8.
Figure 10B:
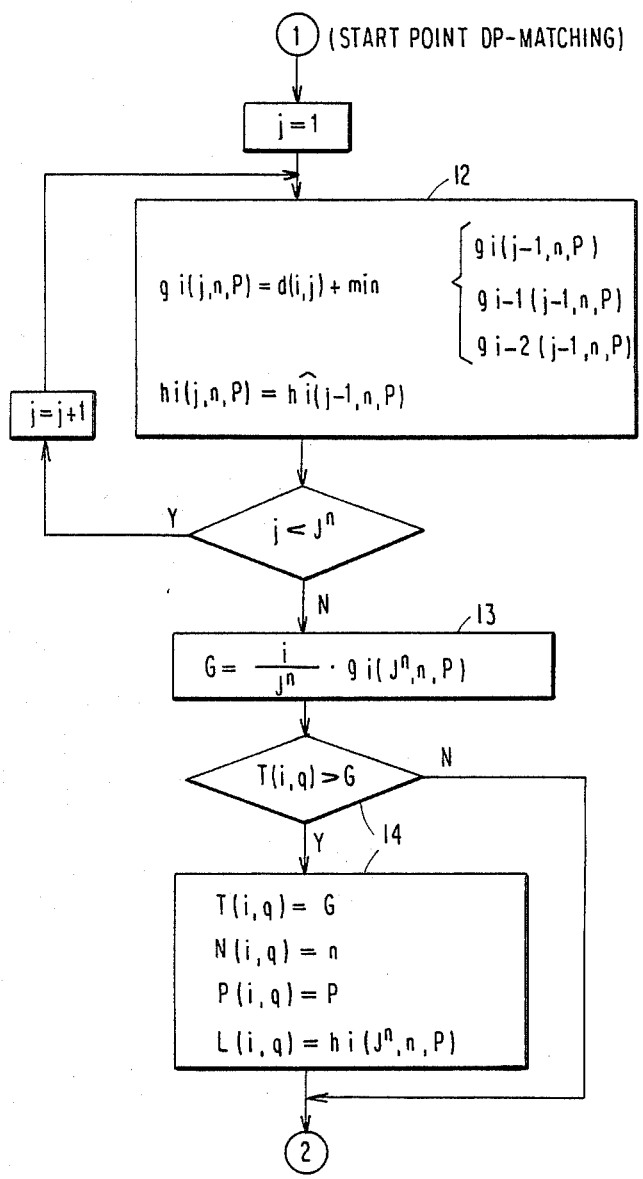

A difference from the first embodiment shown in FIG. 1 will be described below. The DP-matching work memories involve six memories comprising a $g_i$-memory 331, a $g_{i-1}$-memory 332, a $g_{i-2}$-memory 333, a $h_i$-memory 341, $h_{i-1}$-memory 342, and a $h_{i-2}$-memory 343. A dissimilarity measure is calculated along the input pattern time axis i. Namely, initialization corresponding to block 10 in FIG. 10A is performed for the T-memory 200 by the signal SET1 from the control portion 240. In succession, for each input pattern time point i, the state transition rules r(p,n,q) are read out from an automaton memory 230. If $p=0$, the dissimilarity measure is calculated in the start point DP-matching portion 310, and if $p \neq 0$, the dissimilarity measure is calculated in the main DP-matching portion 320. As with the calculation of a dissimilarity measure at the start point, the setting of the boundary conditions corresponding to block 11 in FIG. 10A is first performed by the signal SET2 from the control portion 240. Then, the reference pattern time signal j changes from 1 to $J^n$ and the calculation of a recurrence equation corresponding to block 12 in FIG. 10B is performed in the start point DP-matching portion 310. When the reference pattern time becomes $J^n$, the conversion of the dissimilarity measure corresponding to block 13 in FIG. 10B is performed in the dissimilarity measure conversion portion 350. Then, the minimization of the word boundary corresponding to block 14 in FIG. 10B is performed by using a comparison circuit 170. Finally, the replacement of the work memories corresponding to block 20 in FIG. 10D is performed by signal SET3 from the control portion 240.

Figure 10C:
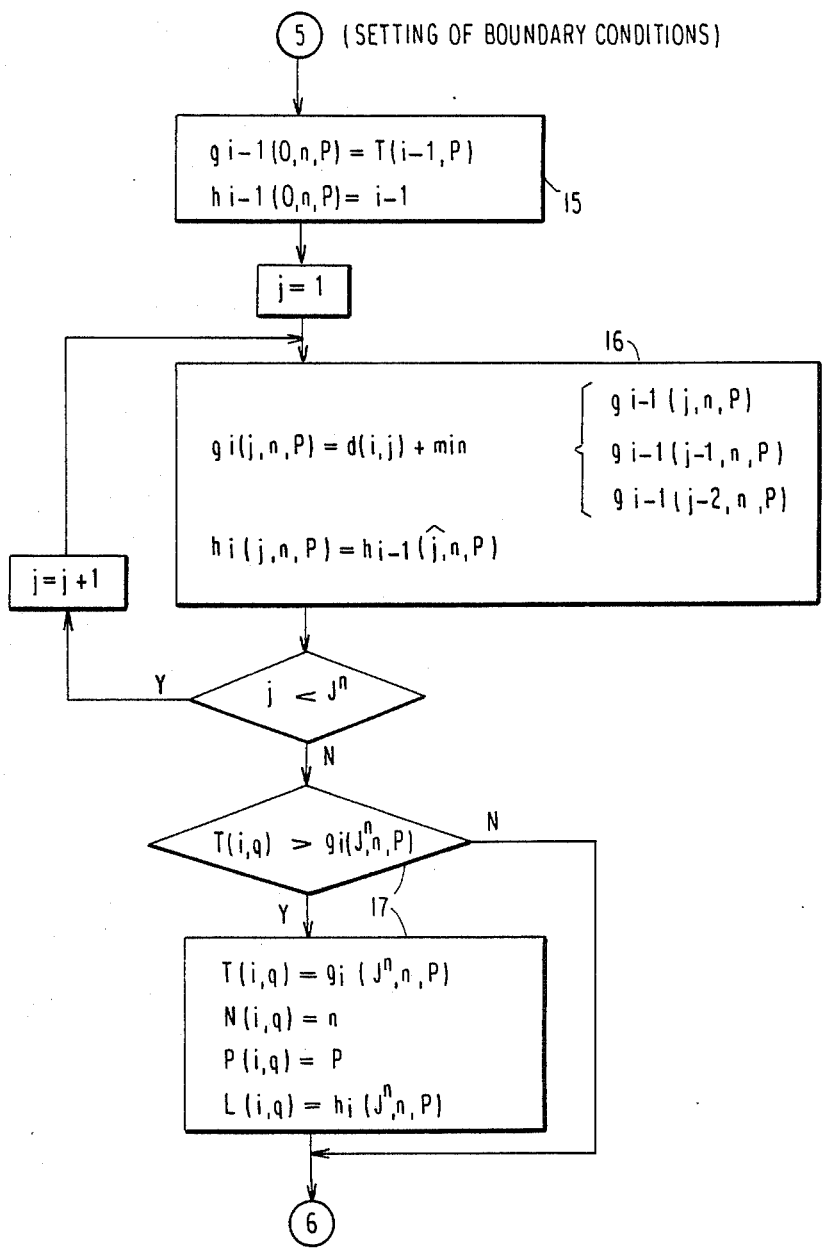
Figure 10D:
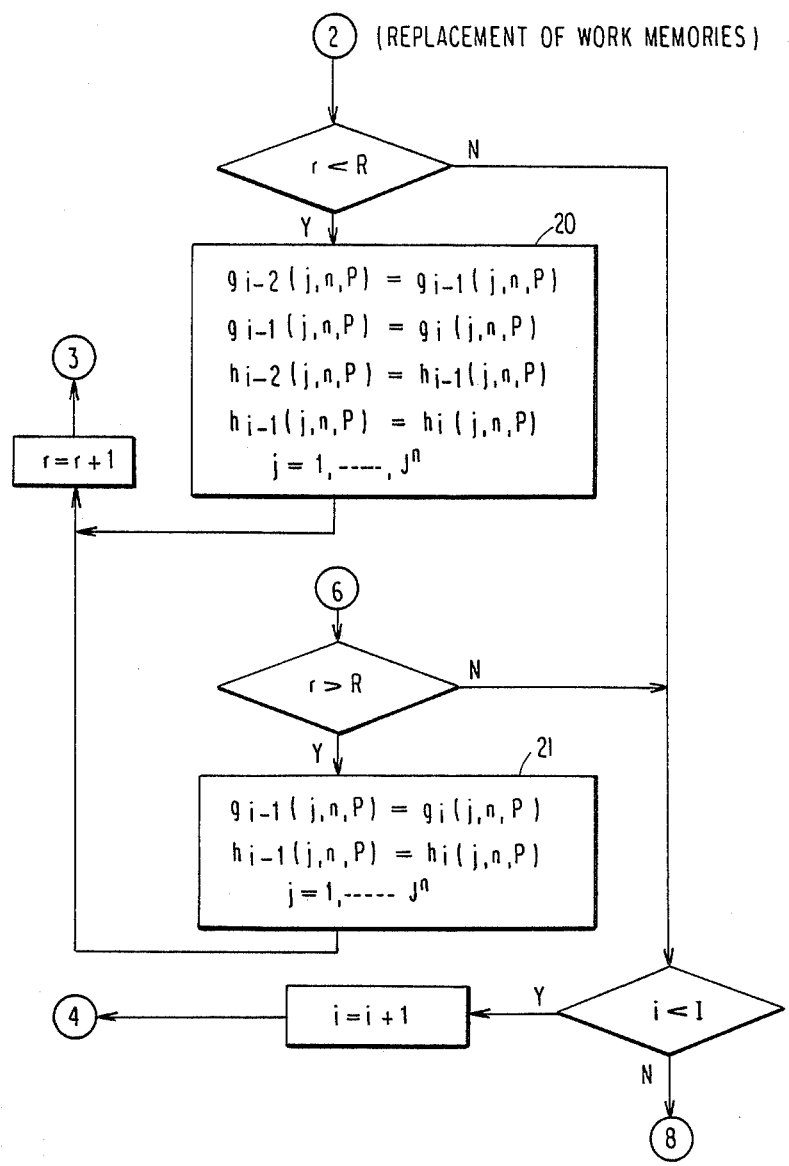

On the other hand, for the calculation of dissimilarity measure at the time points other than the start point, the setting of the boundary conditions corresponding to block 15 in FIG. 10C is first performed by the signal SET2 from the control portion 240. Then, reference pattern time signals j change from 1 to $J^n$ and the calculation of a recurrence equation corresponding to block 16 in FIG. 10C is performed in the main DP-matching portion 320. When the reference pattern time point becomes $J^n$, the minimization of the word boundary corresponding to block 17 in FIG. 10C is performed by using a comparison circuit 170. Finally, the replacement of the work memories corresponding to block 21 in FIG. 10D is performed by signal SET3 from the control portion 240.

Figure 10E:
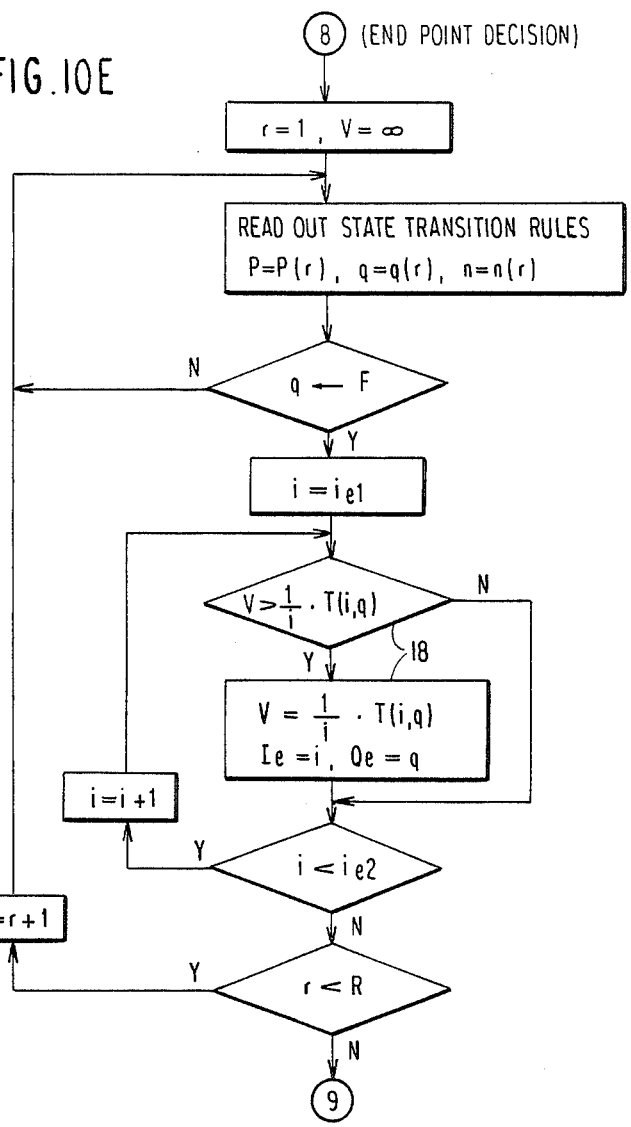
Figure 10F:
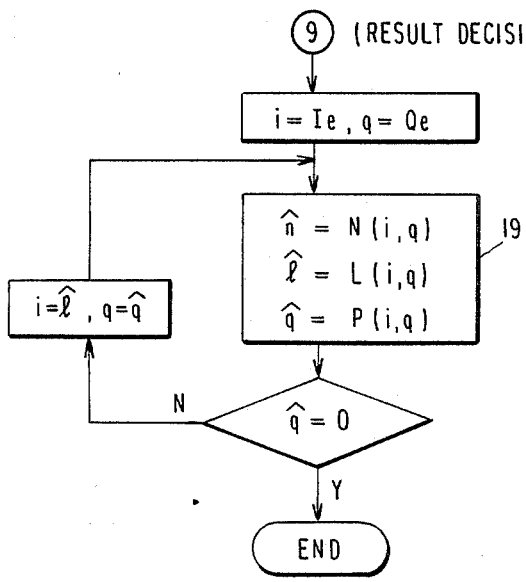

The above-described processing is performed for any state transition rules r and the input pattern time i is determined from 1 to I. The end decision and the decision of recognition results are made in a similar manner to that in the first embodiment (FIGS. 10E to 10F).

The present invention is described above with reference to the embodiments, but the above description does not limit the range of the scope of the present invention. The present invention can be applied to any speech recognition system based on DP-matching.

What is claimed is:

1. A continuous speech recognition apparatus comprising:
    input pattern output means for outputting a signal corresponding to continuously uttered speech as an input pattern;
    reference pattern output means for outputting a plurality of connected reference patterns obtained by connecting previously prepared reference patterns;
    start vicinity setting means for setting a start vicinity of said input pattern;
    first dissimilarity measure calculating means for calculating a first dissimilarity measure between said input pattern and said reference pattern, proportional to the time length of said reference pattern in a portion for a head word of said input pattern; and
    second dissimilarity measure calculating means for calculating a second dissimilarity measure proportional to the time length of said input pattern from a temporary start point on the basis of said first dissimilarity measure, said temporary start point ranging within said start vicinity.

2. A continuously speech recognition apparatus according to claim 1, further comprising a third dissimilarity measure calculating means for calculating a third dissimilarity measure between said input pattern and said reference pattern on second and following digits, which is proportional to the time length of said input pattern based upon said second dissimilarity measure as a boundary condition, said digit being the connection order number of said connected reference pattern.

3. A continuous speech recognition apparatus according to claim 2, further comprising an end vicinity setting means for determining the end vicinity of said input pattern and an end decision means for deciding an end point by using a minimum normalized dissimilarity measure normalized by the time length of said input pattern in said determined end vicinity.

4. A continuous speech recognition apparatus according to claim 3, further comprising a recognition means for outputting said connected reference pattern giving minimum normalized dissimilarity measure as a recognition result.

5. A continuous speech recognition apparatus according to claim 1, wherein said start vicinity setting means is a means for setting as said start vicinity a portion having a given time length before and after a temporary start point at which the level of said uttered speech becomes greater than a given value.

6. A continuous speech recognition apparatus according to claim 3, wherein said end vicinity setting means is a means for setting a portion having a given time length before and after the time point at which the level of said uttered speech becomes smaller than a given value at said vicinity of the end point.

7. A continuous speech recognition apparatus according to claim 1, wherein said conversion in said second dissimilarity measure calculating means is performed in accordance with the following equation:

$$G(i) = (i/J^n) \cdot g(i, J^n)$$

where G(i) denotes the second dissimilarity measure; $J^n$, the time length of the reference pattern; i, the time length of the input pattern; amd $g(i, J^n)$, the first dissimilarity measure obtained at the end time of a reference pattern n.

8. A continuous speech recognition apparatus comprising:
  input pattern output means for outputting a signal corresponding to continuously uttered speech as an input pattern;
  reference pattern output means for outputting a connected pattern of the reference patterns specified by a definite-state automation;
  start point matching means for determining a disimilarity measure proportional to the time length of the reference pattern between said reference pattern in the initial state of the definite-state automation and a portion of a head word of said input pattern;
  dissimilarity measure converting means for converting the dissimilarity measure obtained by said start point matching means into a dissimilarity measure proportional to the time length of said input pattern from a temporary start point, said temporary start point ranging within a vicinity of said input pattern;
  main matching means for determining a dissimilarity measure proportional to the time length of said input pattern between said input pattern and said reference pattern in each state other than said initial state of said definite-state automation in which said converted dissimilarity measure is used as a boundary condition;
  end point decision means for determining an end point having a minimum normalized dissimilarity measure normalized by the time length of said input pattern in an end vicinity; and
  a recognition means for obtaining recognition results by determining the sequence of said reference pattern along a dynamic programming-matching pass, through which said minimum normalized dissimilarity measure is obtained.

9. A continuous speech recognition apparatus comprising:
  means for generating a signal corresponding to continuously uttered speech as an input pattern;
  reference pattern output means for outputting a plurality of connected reference patterns specified by a definite-state atomation;
  start point matching means for determining a dissimilarity measure proportional to the time length of the reference pattern between said reference pattern in the initial state of the definite-state automation and a proportion of a head word of said input pattern;
  dissimilarity measure converting means for converting the dissimilarity measure obtained by said start point matching means into a dissimilarity measure proportional to the time length of said input pattern from a temporary start point, said temporary start point ranging within a vicinity of said input pattern; and
  main matching means for determining a dissimilarity measure proportional to the time length of said input pattern between said input pattern and said reference pattern in each state other than said initial state of said defininte-state automation in which said converted dissimilarity measure is used as a boundary condition.

10. A continuous speech recognition apparatus according to claim 9, further comprising:
  end point decision means for determining an end point having a minimum normalized dissimilarity measure normalized by the time length of said input pattern in an end vicinity.

11. A continuous speech recognition apparatus according to claim 10, further comprising recognition means for obtaining recognition results by determining the sequence of said reference pattern along a dynamic programming matching pass, through which said minimum normalized dissimilarity measure is obtained.

* * * * *

UNITED STATES PATENT AND TRADEMARK OFFICE
CERTIFICATE OF CORRECTION

PATENT NO. : 4,794,645

DATED : December 27, 1988

INVENTOR(S) : WATARI

Page 1 of 2

It is certified that error appears in the above-identified patent and that said Letters Patent is hereby corrected as shown below:

Column 5, line 36, delete "obtaieed" and insert --obtained--;

Column 6, line 51, delete "Methdd" and insert --Method--;

Column 6, line 64, delete "difined" and insert --defined--;

Column 9, line 8, delete "q" and insert --$\hat{q}$--;

Column 11, line 3, delete "amd" and insert --and--;

Column 11, line 14, delete "automation" and insert --automaton--;

Column 11, line 19, delete "automation" and insert --automaton--;

UNITED STATES PATENT AND TRADEMARK OFFICE
CERTIFICATE OF CORRECTION

PATENT NO. : 4,794,645
DATED : December 27, 1988
INVENTOR(S) : WATARI

Page 2 of 2

It is certified that error appears in the above-identified patent and that said Letters Patent is hereby corrected as shown below:

Column 11, line 33, delete "automation" and insert
--automaton--;

Column 12, line 9, delete "automation" and insert
--automaton--;

Column 12, lines 13 and 14, delete "automation" and insert
--automaton--;

Column 12, line 27, delete "automation" and insert
--automaton--;

Signed and Sealed this

Seventh Day of November, 1989

Attest:

JEFFREY M. SAMUELS

Attesting Officer     Acting Commissioner of Patents and Trademarks